United States Patent Office 3,763,268
Patented Oct. 2, 1973

3,763,268
PROCESS FOR HYDROGENATING UNSATURATED HYDROCARBONS BY USE OF SMALL AMOUNTS OF OXYGEN
Gilford A. Chappel, Colonia, N.J., assignor to Esso Research and Engineering Company
No Drawing. Filed Sept. 13, 1971, Ser. No. 180,222
Int. Cl. C07c 5/02
U.S. Cl. 260—683.9         12 Claims

ABSTRACT OF THE DISCLOSURE

Unsaturated hydrocarbons and substituted unsaturated hydrocarbons are hydrogenated in the presence of oxygen at a temperature ranging from 500° K. to 2000° K. and a pressure ranging from .1 to 100 atmospheres. The presence of oxygen acts to increase the rate of hydrogenation of the unsaturated bonds.

FIELD OF THE INVENTION

This invention relates to an improved process for hydrogenating unsaturated bonds. More particularly, the instant invention relates to an improved process for hydrogenating unsaturated and substituted unsaturated hydrocarbons. The hydrogenation is carried out in the presence of small amounts of oxygen, which act to increase the reaction rate. The process of the instant invention is carried out at a temperature of from 500° K. to 2000° K. and a pressure of from 1 atmosphere to 100 atmospheres.

PRIOR ART

The addition of hydrogen to unsaturated products improves their properties in many respects. For example, the color and heat stability of mineral, vegetable and animal oils are improved by hydrogenation. The hydrogenation process, however, has many inherent problems. Hydrogen reacts with the unsaturated bonds, present in the above oils, at a very slow rate. Various heterogeneous catalysts have been utilized which greatly increase the rate of addition of hydrogen. For example, nickel metal, platinum black, palladium black, or copper-zinc cadmium chromite catalysts are used to hydrogenate unsaturated animal and vegetable oils; nickel catalysts are used to hydrogenate low molecular weight olefins; and Ni on $Al_2O_3$ catalysts may be used to hydrogenate the unsaturated products resulting from the thermal cracking of crude oil. These processes are discussed in Unit Processes in Organic Synthesis, edited by Groggins and published by McGraw-Hill.

All of these processes have inherent problems. The heterogeneous catalysts utiilzed are susceptible to poisoning by various impurities in the feed stream, i.e., sulfur and nitrogen compounds. Further, catalyst activity may be decreased by excess heat which acts to reduce the surface area of the catalyst by sintering. Also, since the hydrogenation reaction takes place at the gas-solid or liquid-solid interface, there is a kinetic problem of bringing the reactant to the reactant site.

Various hydrogenation processes are known in the art wherein oxygen is used in conjunction with a catalyst to give increased reaction rates. For example, see the process disclosed in U.S. Pat. 3,412,174.

SUMMARY OF THE INVENTION

According to this invention, it is found that the inclusion of small amounts of oxygen in a process for hydrogenation of unsaturated hydrocarbons greatly increases the rate of conversion.

In general, it has been discovered that the inclusion of from 0.001 to 6.0 mole percent oxygen, in a reaction mixture comprising from 0.1 to 50.0 mole percent of unsaturated hydrocarbon bonds results in an increased rate of hydrogenation. Preferably from 0.01 to 5.0 mole percent oxygen is utilized, while the inclusion of from 0.01 to 1.0 mole percent oxygen in the above reaction mixture is still more preferred.

The unsaturated carbon bonds which may be hydrogenated by the process of this invention include olefinic, acetylenic and aromatic. Further hereto unsaturated bonds such as

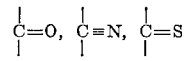

etc. may likewise be hydrogenated in the process of the instant invention. In general compounds of the following general formulas are preferred for hydrogenation in the process of the instant invention:

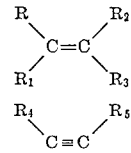

and wherein R, $R_1$, $R_2$, $R_3$, $R_4$ and $R_5$ are selected from the group consisting of hydrogen and substituted and nonsubstituted hydrocarbon radicals, especially hydrogen, $C_1$ to $C_{20}$ alkyl, $C_2$ to $C_{20}$ alkenyl, $C_2$ to $C_{20}$ alkynyl, $C_3$ to $C_{20}$ cycloalkyl, $C_6$ to $C_{20}$ aryl, and $C_7$ to $C_{20}$ alkaryl and aralkyl. The substituents may be selected from the group consisting of halogen, oxygen, nitrogen, sulfur and phosphorous containing radicals. Especially preferred compounds include acetylene, ethylene, propylene, methyl acetylene, diacetylene, dimethylacetylene, allene, and phenylacetylene.

Condensed aromatic type compounds may also be hydrogenated in the process of the instant invention. Representative compounds of this group include naphthalene, anthracene and phenanthrene.

While not willing to be bound by any particular theory, it is believed that oxygen promotes an increased rate of hydrogenation by effectively converting hydrogen molecules to hydrogen radicals. Thus, a more complete conversion is obtained in the presence of oxygen.

The advantages of the instant process can readily be seen. For example, oxygen can be mixed homogeneously with hydrogen which eliminates the various difficulties that have been experienced with heterogeneous catalysts, i.e., poisoning of the surface by impurities in the reactants, kinetic problems of bringing the reactants to the reactive site of the catalyst, etc. Another advantage is the flexibility of the instant process in that reaction rates could be easily controlled by variation of the oxygen concentration. A still further advantage would be economical, since oxygen is much cheaper than the prior art catalysts.

It should be noted that this invention can be practiced in combination with various petroleum industry processes. For example, in catalytic hydrocracking, small amounts of oxygen can be used in place of the metal (hydrogenation) portion of a dual catalyst, e.g., palladium, in a palladium-zeolite hydrocracking catalyst, thereby resulting in increased cost savings. It is known that the degree of dispersion of the metal in the total catalyst matrix is critical to the success of the hydrocracking operation. Oxygen, as noted previously, can be dispersed without difficulty in the reactant gas stream thereby insuring intimate dispersion.

This invention can also be used in conjunction with a thermal cracking process wherein crude stock is cracked with heat and hydrogenated in the presence of small amounts of oxygen.

This invention is particularly useful in the cracking of certain high sulfur and/or nitrogen-containing stocks. These compounds have deleterious effects on the solid catalysts now used in the art, but would not affect the practice of the above invention for the following reasons: (1) There are no reactive sites that can be poisoned; (2) the oxygen is continually being added to the reaction mixture at a rate that results in the continuous presence of a proper amount of oxygen to promote hydrogenation over and above the oxygen consumed in reactions with the nitrogen and sulfur compounds.

In general, this invention relates to a process for the hydrogenation of unsaturated hydrocarbons. The rate of hydrogenation is increased by hydrogenating in the presence of small amounts of oxygen, that is, 0.01 to 6.0 mole percent oxygen, with 0.01 to 1.0 mole percent preferred and 0.1 mole percent most preferred. Oxygen can be introduced into the reaction zone as the pure component or as one component of a gas mixture. The oxygen and hydrogen can be premixed prior to entering the reaction zone or brought to the reaction zone separately. The use of small amounts of oxygen in relation to the hydrogen is contemplated in the practice of this invention. The hydrogen-oxygen ratio should be set with a consideration of safety problems, since it is known that certain mixtures can explode violently. In general, a hydrogen-oxygen mole ratio of from about 100,000 to 16 can be used, while a hydrogen-oxygen mole ratio of from about 10,000 to 16 is preferred, with an $H_2$-$O_2$ mole ratio of 100 to 16 still more preferred.

The unsaturated hydrocarbon can be introduced into the reaction zone in the form of a liquid or a gas, with the gaseous state being preferred. The temperature at which the reaction is carried out can vary from 500° K. to 2000° K. with a temperature range of from 800° K. to 1200° K. being preferred. The pressure at which the reaction is carried out can vary from .1 to 100 atmospheres with a pressure range of 1 to 60 atmospheres being preferred.

The feed stock which can be used in the process of this invention is essentially an unsaturated hydrocarbon, with the unsaturated moieties comprising from only a few tenths mole percent up to 100 mole percent. The unsaturated hydrocarbons can also be formed during the hydrogenation reaction by heat such as in thermal cracking or by heat and catalyst such as in hydrocracking processes. Feed stocks which can be used in the practice of this invention include ethylene, propylene, butylene, butadiene and other mono and poly unsaturated aliphatics. Unsaturated cyclic aliphatics can also be used as feed stocks for this invention, such as cyclopentene, cyclohexene, etc. Feed stocks that are familiar to the petroleum industry can also be hydrogenated using the process of this invention. Examples are coal, shale oil, tar, crude oil and crude oil distillates. These stocks will usually be hydrogenated in conjunction with another process such as catalytic or thermal cracking. This invention is especially applicable to feed stocks which either contain low molecular weight unsaturated hydrocarbon, i.e., $C_2$ to $C_{10}$ hydrocarbons, or are reacted to produce said low molecular weight hydrocarbons in situ. Feed streams can be diluted with inert diluents, such as $N_2$, A, $CO_2$, steam, etc. It is especially contemplated that air will be used as a source of oxygen, with the nitrogen present providing at least a portion of the diluent.

Although this process can be run batch to batch, it is contemplated that it will be continuous or semicontinuous. Reactors that are familiar to the art such as heated flow and static reactors are adequate. It will be necessary to determine optimum conditions for hydrogenating each of the various feeds with a consideration of the type and dimensions of the reactor that will be used. Hydrocarbon-hydrogen contact times will be determined for each specific case and can vary from one millisecond to a few minutes.

The following examples will illustrate the invention.

The following experiments were run using a single-pulse shock tube. This device is capable of generating a well-defined reaction environment at very high temperatures, thus being suited for the study of gaseous reactions. The dwell or reaction time is approximately one millisecond which precludes wall effects. In the following studies the temperature ranged from 1000° K. to 1400° K. with a total pressure of 13 atmospheres. The reaction mixture consisted of 0.1 mole percent ethylene or acetylene as model compounds, 25 mole percent hydrogen, 74.8 mole percent argon and 0.1 mole percent oxygen. In order to produce reference data, the oxygen was omitted in several experiments.

Basically the shock tube is a stainless steel pipe 18 feet long with a three-inch inside diameter. The tube is divided into two sections (6 feet and 12 feet) by an aluminum diaphragm of 0.016 inch thickness. The aluminum disc has two perpendicular grooves of fixed depth milled into the surface which controls the pressure drop at which the diaphragm will rupture. In a typical experiment the tube is evacuated to 0.05 torr, then the 12-foot reaction section pressurized with the reactant mixture to a predetermined value (300–800 torr). Finally, the six-foot driver section is pressurized with helium until the diaphragm bursts. At this point, a shock wave forms and travels down the reactant section compressing and heating the gaseous mixture. Since the end of the reactant section is closed, the shock wave reflects off the endplate and travels back into the already heated gas. This additional heating raises the temperature of the reactant gas to the preselected reaction temperature. Thus, the reactions of interest occur behind the reflected shock wave. The temperature rise is essentially instantaneous. As the shock wave is initiated, an expansion or rarefaction wave forms which moves in the opposite direction. After this wave reflects from the closed end of the driver section, it moves down the tube behind the shock wave and eventually intersects the reflected shock wave. The result is a very rapid cooling and quenching of the hot reaction zone. Initial cooling rates are of the order of $10^5$° K. per second. The net effect is a reaction time of approximately one millisecond. Pressure data are obtained via three quartz piezoelectric transducers fitted directly into the shock tube. After removing the gaseous products from the shock tube, the exact composition was determined by use of the gas chromatograph.

Example 1.—Acetylene hydrogenation

The hydrogenation of acetylene to ethylene was accompanied by significant conversion to ethane and methane as the following table indicates.

TABLE I.—HYDROGENATION OF ACETYLENE [1] PROMOTED BY OXYGEN

|  | T (° K.) | $C_2H_4$ | $C_2H_6$ | $CH_4$ |
|---|---|---|---|---|
| With $O_2$ | 950 | [2] 25 | 11 | 6 |
| Without $O_2$ | 950 |  |  |  |
| With $O_2$ | 1,050 | 32 | 25 | ≈20 |
| Without $O_2$ | 1,050 | 3 | 0 | 0 |
| With $O_2$ | 1,100 | 35 | 24 | ≈35 |
| Without $O_2$ | 1,100 | 8 | Trace | Trace |
| With $O_2$ | 1,150 | 37 | 18 | 53 |
| Do | 1,230 | 35 | 12 | 67 |
| Do | 1,360 | 37 | 5 | 52 |

[1] Feed consisted of 0.1 mole percent $C_2H_2$, 25 mole percent $H_2$, 0.1 mole percent $O_2$ and 74.8 percent argon.
[2] Moles of product per 100 moles of acetylene in feed.

Note that as the reaction temperature is increased, the product methane begins to crack back to the thermodynamically favored acetylene, but it is obvious that an increased rate has resulted from the addition of oxygen. Quantitatively, 36% of the feed was hydrogenated to ethylene and ethane at 950° K. in the presence of $O_2$ whereas essentially no reaction occurs in the absence of $O_2$. At 1050° K. the corresponding values are 60% and 3%. The carbon balance remained around 90% throughout all the experiments. Small amounts of carbon monoxide formed but were not measured quantitatively. As expected, the CO yield tended to rise with increasing reaction temperature.

Example 2.—Ethylene hydrogenation

Table II contains shock tube results from a feed consisting of 25 mole percent $H_2$, 0.1 mole percent $C_2F_4$, varying amounts of oxygen and the balance argon. Again, the reaction time was one millisecond and the total reaction pressure was 13 atmospheres.

TABLE II.—HYDROGENATION OF ETHYLENE PROMOTED BY OXYGEN (SHOCK TUBE)

| | T (° K.) | $C_2H_6$ remaining | $C_2H_6$ | $CH_4$ |
|---|---|---|---|---|
| 1% $O_2$ | 1,000 | [1] 80 | 3 | 2 |
| 0.1% $O_2$ | 1,000 | ≈95 | 5 | 0 |
| No $O_2$ | 1,000 | 100 | 0 | 0 |
| 1% $O_2$ | 1,025 | ≈35 | ≈5 | ≈30 |
| 0.1% $O_2$ | 1,025 | 80 | ≈18 | 3 |
| No $O_2$ | 1,025 | 100 | 0 | 0 |
| 1% $O_2$ | 1,050 | 4 | 2 | ≈100 |
| 0.1% $O_2$ | 1,050 | 60 | 33 | 9 |
| No $O_2$ | 1,050 | ≈100 | Trace | 0 |
| 0.1% $O_2$ | 1,150 | 32 | 18 | 80 |
| No $O_2$ | 1,150 | 94 | 2 | 0 |

[1] Moles of product per 100 moles of $C_2H_4$ in the feed.
[2] The mixture without $O_2$ contained 25% $D_2$ instead of $H_2$. This will not affect the results.

The dramatic effect of the addition of oxygen is demonstrated by the data at 1050° K. In the absence of $O_2$ no reaction occurs whereas 1.0 mole percent $O_2$ results in only 2 moles of ethane but 100 moles of methane. The mixture containing 0.1% $O_2$ produces 33% conversion to ethane.

Since the oxygen promotion effect was demonstrated at high temperature and short reaction times, it was of interest to show its existence at lower temperatures and longer dwell times.

In order to gather information at lower temperatures and longer dwell times, a simple flow reactor system was constructed which consisted mainly of a quartz tube reactor heated by an electric furnace. The tube had three thermocouples fixed to the outside wall which gave an approximate reading of the temperature profile (essentially flat). The heated portion of the tube was 70 cm. long and one cm. in diameter. The volume flow rates were adjusted to give the desired average residence time. No preheating or quenching techniques were used unless necessary to vaporize the feed. The feed mixtures were made up in steel storage tanks at 50 p.s.i.g. A small amount of xenon was added to serve as an internal standard. A typical feed mixture would consist of 1 mole percent olefin, 1% xenon, 0.1 mole percent oxygen and 97.9 mole percent hydrogen.

The procedure was somewhat different for the naphthalene experiment described below. The steel feed tanks contained hydrogen plus a trace of oxygen. This gas was bubbled through a flask containing molten naphthalene, and the resulting gas mixture was led through heated lines to the reactor inlet. The amount of naphthalene in the feed stream was governed by the flask temperature. The total pressure in all flow reactor experiments was one atmosphere.

Example 3.—Ethylene hydrogenation

The data from the following experiments with ethylene definitely show that the rate of ethylene disappearance increases with increasing oxygen concentration. However, the rate at which ethylene is hydrogenated to ethane does not follow this simple rule. As the oxygen concentration increases beyond an optimum value, more of the ethylene is converted to methane and less to ethane. Table III contains data on the maximum observed ethane yield from a feed containing 1% $C_2H_4$ and at least 98% $H_2$.

TABLE III.—MAXIMUM ETHANE YIELD FROM ETHYLENE (FLOW REACTOR)

| Residence time | No $O_2$ | | 0.01% $O_2$ | | 1.0% $O_2$ | |
|---|---|---|---|---|---|---|
| 2 seconds | [1] 52 | ([2] 977° K.) | 80 | (895° K.) | 68 | (840° K.) |
| 6 seconds | 55 | (950° K.) | 92 | (840° K.) | 62 | (811° K.) |

[1] Moles of ethane per 100 moles of $C_2H_4$ in the feed.
[2] Temperature at which maximum yield observed.

Thus, 92% of the feed ethylene was converted to ethane at 840° K. with a six second dwell time in the presence of 0.01% $O_2$ while only 2% was converted at this temperature in the absence of oxygen.

As the molar ratio of hydrogen to ethylene decreases, the extent of hydrogenation also drops, all other factors being equal. Thus, a feed with an $H_2/C_2H_4$ ratio of 99/1 containing 0.01 mole percent $O_2$ produced 92% conversion to ethane at 6 seconds residence time. By decreasing the $H_2/C_2H_4$ feed ratio to 25/1, the optimum yield dropped to 72%. Also, the temperature at which the maximum yields were observed increased from 850° K. for the 99/1 feed to 900° K. for the 25/1 feed. However, the extent of ethylene hydrogenation to ethane is more directly dependent on the actual hydrogen concentration than on the mole ratio of hydrogen to hydrocarbon. Two feed mixtures containing the same ratio of hydrogen to hydrocarbon (5/1) but different hydrogen concentrations (50%, 5%) produced very different results. The mixture containing 50% hydrogen produced a maximum ethane yield of 40 moles at 1050° K. with a 10 second dwell time. The mixture with only 5% $H_2$ produced a maximum of only 10 moles of ethane at 960° K. Both feeds contained 0.1 mole percent oxygen.

Example 4.—Naphthalene hydrogenation

Data for naphthalene hydrogenation are in terms of selectivities, i.e., moles of product per mole of naphthalene converted, instead of conversion. 75% of the naphthalene ($C_{10}H_8$) converted was hydrogenated to some extent at 1050° K. in the presence of 1 mole percent oxygen. The feed mixture consisted of approximately 10 mole percent naphthalene, 1 mole percent $O_2$, and 89% $H_2$. The hydrogenated $C_{10}$ was apparently a mixture of dialin (dihydronaphthalene), Tetralin (tetrahydronaphthalene), and Decalin (decahydronaphthalene). Conversion was not measured directly, but calculations suggest that it was less than 25%. As the reaction temperature increased, the amount of light gas and benzene also rose. The presence of 0.1 mole percent oxygen was insufficient to promote a significant degree of reaction but in the absence of oxygen, absolutely no reaction occurred at the conditions studied.

The above experiments outlined in Table IV demonstrate that the presence of 1 mole percent oxygen does promote the hydrogenation/hydrocracking of condensed aromatics as might be found in petroleum residuum, coal and shale oil. This can be accomplished without the aid of the conventional solid catalysts.

TABLE IV.—HYDROGENATION OF NAPHTHALENE IN FLOW REACTOR

| Feed composition | Run No. | Temp. ° F. | ° K. | Dwell time, sec. | Moles per mole $C_{10}H_8$ cracked | | | | | |
|---|---|---|---|---|---|---|---|---|---|---|
| | | | | | $CH_4$ | $C_2H_6$ | $C_2H_4$ | $C_2H_2$ | $C_6H_6$ | $C_{10}$ |
| Naphthalene | N-10 | 1,320 | 990 | 4 | 1.25 | .56 | .34 | .025 | .9 | .14 |
| 99% $H_2$ | N-11 | 1,420 | 1,045 | 4 | .28 | .10 | .18 | .025 | .27 | .75 |
| 1% $O_2$ | N-9 | 1,540 | 1,110 | 4 | .83 | .17 | .70 | .22 | .85 | .20 |

Example 5.—Nonpromotion of $H_2O$ in the above

The following experiments demonstrate that $H_2O$ does not promote the above hydrogenation reaction, even though $O_2$ in the presence of $H_2$ under the above-described reaction conditions is converted primarily to $H_2O$.

A gaseous stream, consisting of 1.5 mole percent water vapor and 98.5% hydrogen, was passed through molten naphthalene to entrain the hydrocarbon vapor. The homogeneous mixture then entered a quartz tubular reactor maintained at 1050° K. by an electric furnace. At a residence time of four seconds, no reaction was observed. As reported above, the presence of 1.0 mole percent oxygen ($O_2$) in the feed stream promoted a significant amount of reaction with a high selectivity to hydrogenated $C_{10}$'s under the same reaction conditions.

A feed mixture consisting of 1.0 mole percent ethylene, 0.7 mole percent water vapor and the remainder hydrogen was passed through the quartz tube reactor and the products were analyzed by gas chromatography. The residence time for all runs was six seconds. A number of experiments were carried out with the reactor temperature ranging from 850° K. to 1075° K. The degree of conversion to ethane was in excellent agreement with our former base case data taken under identical experimental conditions except that the feed contained only ethylene and hydrogen. The conversion to ethane was much less than that occurring in the presence of a small amount of oxygen.

The conclusion drawn from these two sets of experiments is that the presence of water vapor has no measurable effect upon the reactions considered.

What is claimed is:

1. A process for the hydrogenation of unsaturated hydrocarbons, which consists essentially of contacting said unsaturated hydrocarbons at reaction conditions with hydrogen, at a temperature of from about 500° to 2000° K. and a pressure of from about 0.1 to 100 atmospheres, in the presence of from about .001 to 6.0 mole percent of oxygen.

2. The process of claim 1 wherein said unsaturated hydrocarbon is a condensed aromatic.

3. The process of claim 1 wherein said contacting takes place at a temperature of from about 800° to 1200° K. and a pressure of from about 1 to 60 atmospheres.

4. The process of claim 3 wherein the oxygen varies in an amount from 0.01 to 1 mole percent of the total reaction mixture.

5. The process of claim 3 wherein said hydrocarbon is ethylene.

6. The process of claim 3 wherein said hydrocarbon is acetylene.

7. The process of claim 11 wherein said hydrocarbon is naphthalene.

8. The process of claim 1 wherein said unsaturated hydrocarbons are formed in a thermal cracking process by the action of heat on a feedstock chosen from the group consisting of crude oil, shale oil, tarsand, coal, and petroleum residuum.

9. The process of claim 1 wherein said unsaturated hydrocarbons are formed in a catalytic hydrocracking process.

10. The process of claim 3 wherein said hydrocarbon is selected from the group consisting of compounds having the general formula:

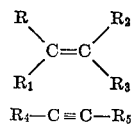

and $$R_4-C \equiv C-R_5$$

wherein R, $R_1$, $R_2$, $R_3$, $R_4$ and $R_5$ are selected from the group consisting of hydrogen and substituted and non-substituted hydrocarbon radicals, wherein said hydrocarbon radicals are selected from the group consisting of $C_1$ to $C_{20}$ alkyl, $C_2$ to $C_{20}$ alkenyl, $C_2$ to $C_{20}$ alkynyl, $C_3$ to $C_{20}$ cycloalkyl, $C_6$ to $C_{20}$ aryl, and $C_7$ to $C_{20}$ alkaryl and aralkyl, and said substituents are selected from the group consisting of halogen, oxygen, nitrogen, sulfur and phosphorous containing radicals.

11. The process of claim 2, wherein said unsaturated hydrocarbon is selected from the group consisting of naphthalene, anthracene, and phenanthrene.

12. The process of claim 1 wherein the hydrogen-oxygen mole ratio varies from about 100 to 16.

References Cited
UNITED STATES PATENTS 3,413,214   11/1968   Galbreath  ---------- 208—143
3,412,174   11/1968   Kroll  ------------- 260—683.9

DELBERT E. GANTZ, Primary Examiner

J. M. NELSON, Assistant Examiner

U.S. Cl. X.R.
260—667; 208—143